(12) United States Patent
Winstead

(10) Patent No.: US 7,714,770 B2
(45) Date of Patent: May 11, 2010

(54) FILTERING NAGC RESPONSE TO NOISE SPIKES

(75) Inventor: Benjamin J. Winstead, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 11/778,452

(22) Filed: Jul. 16, 2007

(65) Prior Publication Data

US 2009/0021419 A1  Jan. 22, 2009

(51) Int. Cl.
*G01S 13/00* (2006.01)
(52) U.S. Cl. ............................................ 342/92; 342/91
(58) Field of Classification Search .................... 342/92
See application file for complete search history.

(56) References Cited

U.S. PATENT DOCUMENTS

| | | | |
|---|---|---|---|
| 4,077,038 A | 2/1978 | Heller et al. | |
| 4,079,376 A | 3/1978 | Kirk, Jr. | |
| 5,502,448 A | 3/1996 | Cantrell et al. | |
| 6,177,904 B1 | 1/2001 | Coenen et al. | |
| 6,670,914 B1 | 12/2003 | Najarian et al. | |
| 6,867,728 B1 * | 3/2005 | Hanna et al. | 342/91 |
| 2004/0033789 A1 | 2/2004 | Tsien | |
| 2004/0066323 A1 | 4/2004 | Richter | |
| 2004/0095269 A1 | 5/2004 | Uehara et al. | |
| 2004/0135992 A1 * | 7/2004 | Munro | 356/4.01 |
| 2004/0239559 A1 | 12/2004 | King et al. | |
| 2004/0246471 A1 * | 12/2004 | Matsuura et al. | 356/141.4 |
| 2005/0059363 A1 | 3/2005 | Hansen et al. | |
| 2007/0030931 A1 | 2/2007 | Arambepola | |

* cited by examiner

*Primary Examiner*—Thomas H Tarcza
*Assistant Examiner*—Timothy A Brainard
(74) *Attorney, Agent, or Firm*—Foggs & Powers LLC

(57) ABSTRACT

A method and apparatus for dealing with noise spikes in a radar system is provided. The method includes monitoring a noise channel in the radar system. Controlling gain with a control loop based at least in part on the monitored noise channel and ignoring noise spikes detected in the noise channel when controlling gain with the control loop.

20 Claims, 5 Drawing Sheets

FILTERING NAGC RESPONSE TO NOISE SPIKES

BACKGROUND

Aircraft use radar altimeter systems or radar systems to determine distance to objects and the ground. One issue that every radar system must deal with is noise. In particular varying thermal noise inherent in radio receiving systems. To deal with the noise, some radar systems use a varying threshold. Any signal below the threshold is discarded as noise and any signal above a threshold is considered a valid target. Setting the threshold is critical because if it is set too high the radar system may not track valid weak signal returns and if it set to low the system could track invalid targets due to noise. A typical method of setting the threshold is by using a determined signal to noise ratio (noise ratio). In this method, the noise is monitored through a noise channel. Gain in a receiver stage of the system is used to keep the system at the select noise ratio. Gain is controlled by a noise automatic gain control (NAGC) circuit. This can generally be referred to as a gain control loop or the control loop. In this type of system, with an increase of noise, the system via the gain control loop will reduce the receiver gain to keep a constant noise ratio.

One common problem encountered with the use of the noise ratio to control the gain is that noise spikes can be seen by the system as thermal noise. As a result of a noise spike, the gain control loop reduces the receiver gain to maintain the constant noise ratio which will result in a loss of system sensitivity. This can lead to the radar system losing the track of a ground return or other valid radar return. Noise spikes can occur when two radar systems are in close proximity to each other while their transmitters are transmitting in the same frequency band. For example, when two aircraft are in wingman formation. These noise spikes are caused by both cross coupling that occurs directly between the airplanes and the returns off the ground that originally were transmitted from another altimeter. The effects of cross coupling and detecting another altimeter's return can be reduced by periodically changing frequency or the pulse repetition interval. However, random spikes will still occur.

For the reasons stated above and for other reasons stated below which will become apparent to those skilled in the art upon reading and understanding the present specification, there is a need in the art for an effective and efficient method and apparatus for dealing with noise spikes.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of dealing with noise spikes in a radar system is provided. The method includes monitoring a noise channel in the radar system. Controlling gain with a control loop based at least in part on the monitored noise channel and ignoring noise spikes detected in the noise channel when controlling gain with the control loop.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of dealing with noise spikes so they do not affect receiver sensitivity in a radar system. For example, in one embodiment, noise spikes are ignored. In particular, in one embodiment, multiple noise samples in a noise channel of the radar system are taken over a period of time. Statistical analysis of the samples is applied. Results of the statistical analysis are compared with a select value that would indicate the presence of noise spikes. Based on the comparison it is determined if noise spikes are present. If they are present the noise spikes are ignored. In embodiments, ignoring the noise spikes includes not using noise detected in the noise channel associated with the noise spike to adjust the gain in the receiver stages of the radar system.

Figure 1:
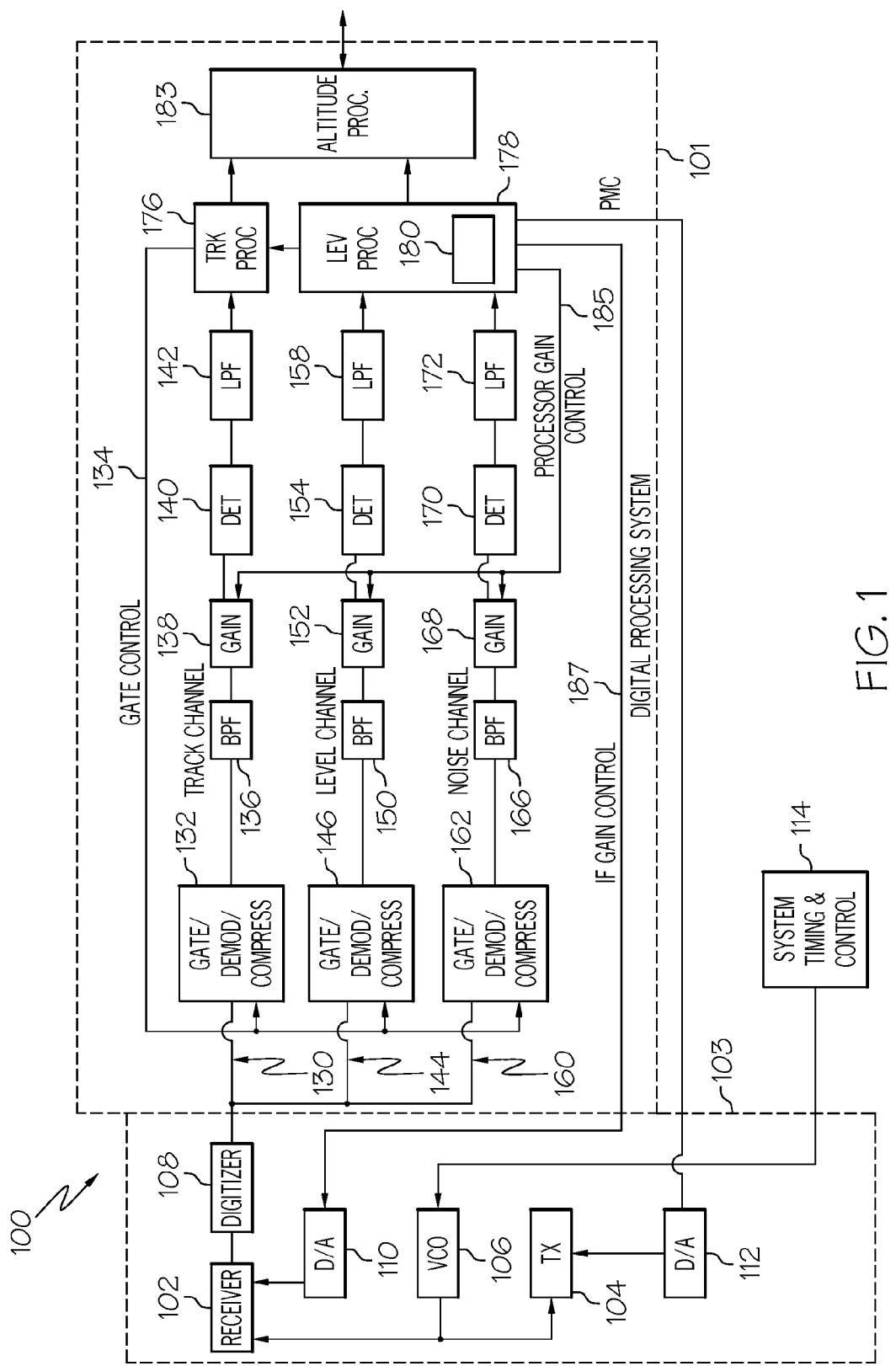
FIG. 1 is a block diagram of a radar altimeter system of one embodiment of the present invention.

Referring to FIG. 1, a block diagram of a radar altimeter system 100 of one embodiment is illustrated. The radar system 100 includes a system timing and control controller 114, a digital processing system 101 and an analog portion 103. The analog portion includes a transmitter 104 to transmit radar signals and a receiver 102 to receive return signals. The analog portion 103 also includes a voltage control oscillator 106 that provides frequency control of receiver 102 and the transmitter 104. As illustrated, the voltage control oscillator 106 is under control of the system timing and control controller 114. A digitizer 108 coupled to the receiver 102 provides an analog to digital conversion. Moreover, the receiver 102 includes a down conversion that brings a transmitted frequency down to an intermediate frequency (IF). Further illustrated, the analog portion 103 includes digital to analog (D/A) converters 112 and 110 to convert digital signals from the digital processing system 101 to transmitter 104 and receiver 102 respectively.

FIG. 1 also illustrates that the digital processing system 101 includes three different channels in this embodiment. The channels include a track channel 130, a level channel 144 and a noise channel 160. Each of the channels 130, 144 and 160 include gating circuits 132, 146 and 162 respectively. The gating circuits 132, 146 and 162 gate the signals from the receiver by selecting a certain time range of samples to provide to filters. In one embodiment, an altitude delay feedback signal is provided to the gating circuits from a track processor 176 via gate control 134 to adjust the time range. The filters in this embodiment include band pass filters 136, 150, and 166. Each channel 130, 144 and 160 further includes gain circuits 138, 152 and 168 respectively. The gain circuits 138, 152, and 168 can be placed anywhere in the respective channels 130, 144 and 160. Each channel 130, 144 and 160 also includes a detector circuit 140, 154 and 170 respectively. The detector circuits 140, 154 and 170 rectify an AC signal and pass it on to a respective low pass filter 142, 158 and 172. The detector blocks 140, 154 and 170 can incorporate one of an absolute value, square function or any other suitable means of providing rectification of the signal. As illustrated, the channels 130, 144 and 160 still further include a track processor 176 and a level processor 178. The track processor 176 receives an input from the low pass filter 142 in the track channel 130 and an output from the level processor 178. The track processor 176 provides an output to an altitude processor 183 and to the gating circuits 132, 146 and 162. In one embodiment, the track processor 176 provides separate gate positions and gate widths for each gating circuit 132, 146 and 162. The level processor 178 receives inputs from low pass filter 158 in the level channel 144 and the low pass filter 172 in the noise channel 160. The altitude processor 183 determines the altitude based on inputs from the track processor 176 and the level processor 178.

The level processor 178 includes a gain controller 180 in this embodiment. The gain controller 180 is used to control the gain of the radar system via a noise automatic gain control (NAGC) circuit loop. The NAGC circuit loop can be generally referred to as the control loop. In one embodiment, the control loop includes the processor gain control loop 185. In this embodiment, the digital gain control circuits 138, 152, and 168 in channels 130, 144, and 160 are controlled by the gain controller 180 via processor gain control loop 185. In another embodiment, gain control circuits 138, 152, and 168 may each be assigned different gain values. In yet another embodiment, variable gain circuits in the receiver 102 are used to control the gain. In this embodiment, the control loop includes an IF gain control loop 187 and the digital to analog converter 110. Hence, in embodiments of the present invention the gain can be controlled either in the analog portion 103 or the digital processing system portion 101 by the gain controller 180 via control loop 185 or 187.

Figure 2:
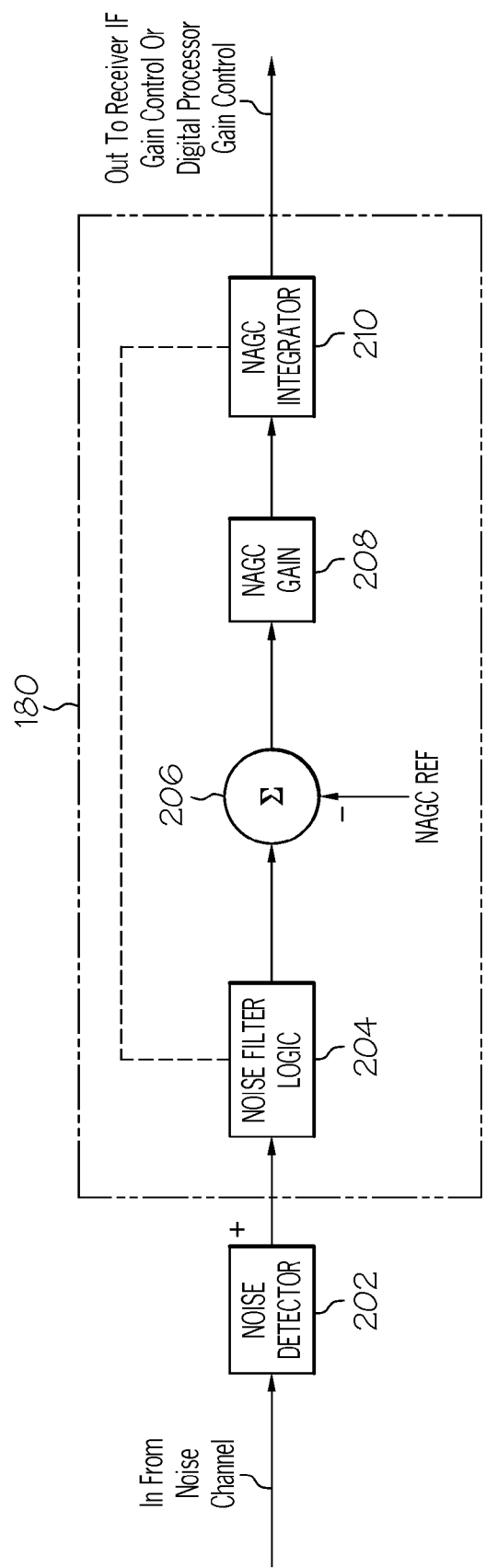
FIG. 2 is a block diagram of gain controller of one embodiment of the present invention.

An embodiment of the gain control circuit 180 is illustrated in the block diagram of FIG. 2. In this embodiment, a signal from the noise channel 160 is passed through a noise detector 202. The noise detector 202 in one embodiment, represent both the detector circuit 170 and the low pass filter 172 in noise channel 160 of the radar altimeter system 100 of FIG. 1. The gain controller 180 of FIG. 2 includes noise filter logic 204. The noise filter logic 204 takes the signal from the noise detector 202 and determines if the signal that represents noise should be sent on to the NAGC loop for processing. Hence, the noise filter logic 204 detects noise spikes and prevents them from affecting the gain of the radar system.

Figure 3:
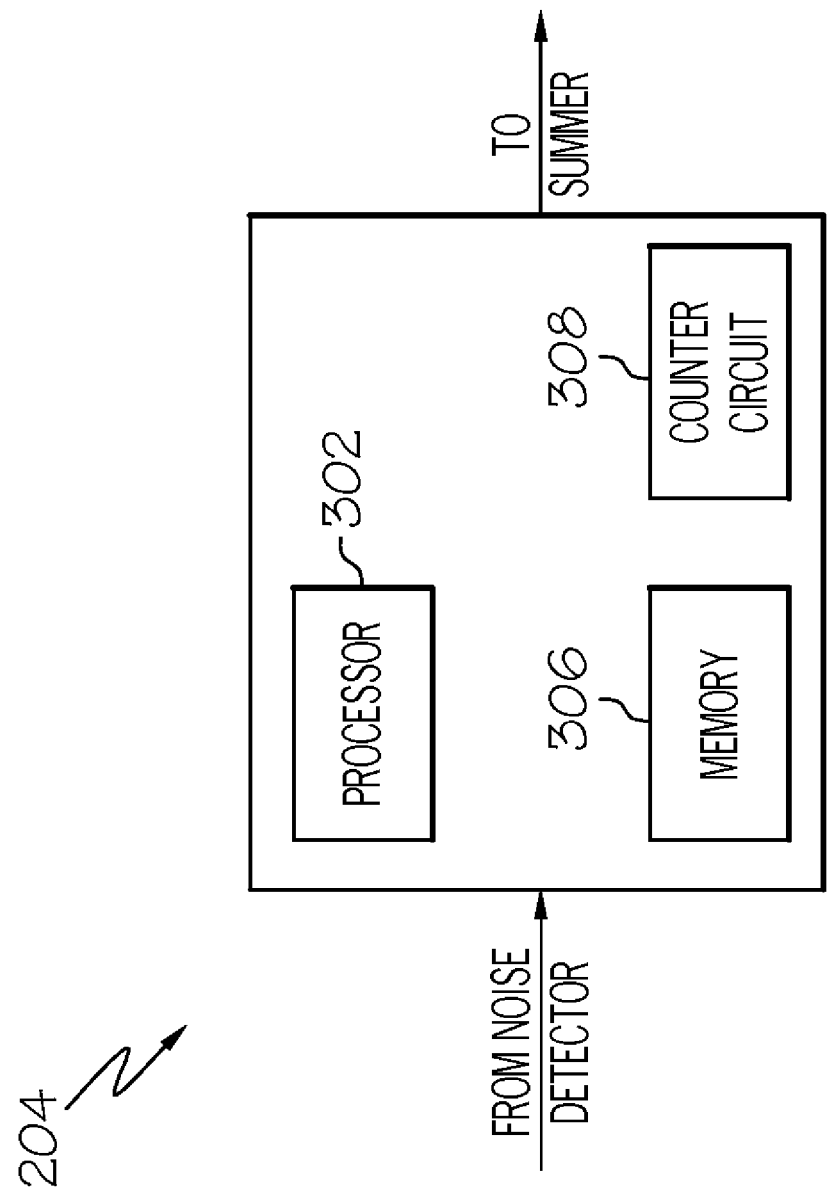
FIG. 3 is a block diagram of a noise filter logic circuit of one embodiment of the present invention.

The methods and techniques used by the noise filter logic 204 as described below can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) used in the noise filter logic 204. An example of an embodiment of a noise filter logic circuit 204 is illustrated in the block diagram of FIG. 3. As illustrated, the noise logic circuit 204 of this embodiment includes a processor 302, a memory and a counter circuit 308. The processor 302 controls function of the circuit 204. The memory stores data such as counter and reference values as well as noise levels. The counter circuit 308 tracks times with one or more counters.

Referring back to FIG. 2, the gain controller 180 further contains a summer 206, a NAGC gain circuit 208 and a NAGC integrator 210. The summer 206 compares a signal from the noise filter logic 204 to a NAGC reference. An output of the summer 206 then gets amplified by the NAGC gain 208 and is applied to the NAGC integrator 210. The NAGC integrator outputs a digital value that is used to adjust the gain at either the process gain circuit 168 in the digital processing system or the IF stage of the receiver 102 in the analog portion 103 via respective gain control loop 185 or 187. In one embodiment, a scaling circuit (not shown) scales and level shifts an output from NAGC integrator before the signal is applied to the respective gain control loop 185 or 187. As stated above, the noise filter logic 204 controls an output of the gain controller 180 to ignore noise spikes. One method used to control the gain controller 180 to ignore noise spikes is by outputting a value, such as a value equal to the NAGC ref, so that the summer 206 will output a zero which in turn will not change the gain in the radar system. In another method, the noise filter logic 204 controls the NAGC integrator to maintain a prior value for a processing cycle. Other methods of controlling gain due to noise spikes via gain control loops 185 or 187 are contemplated. All that is required is that the radar system is configured to ignore noise spikes.

Figure 4:
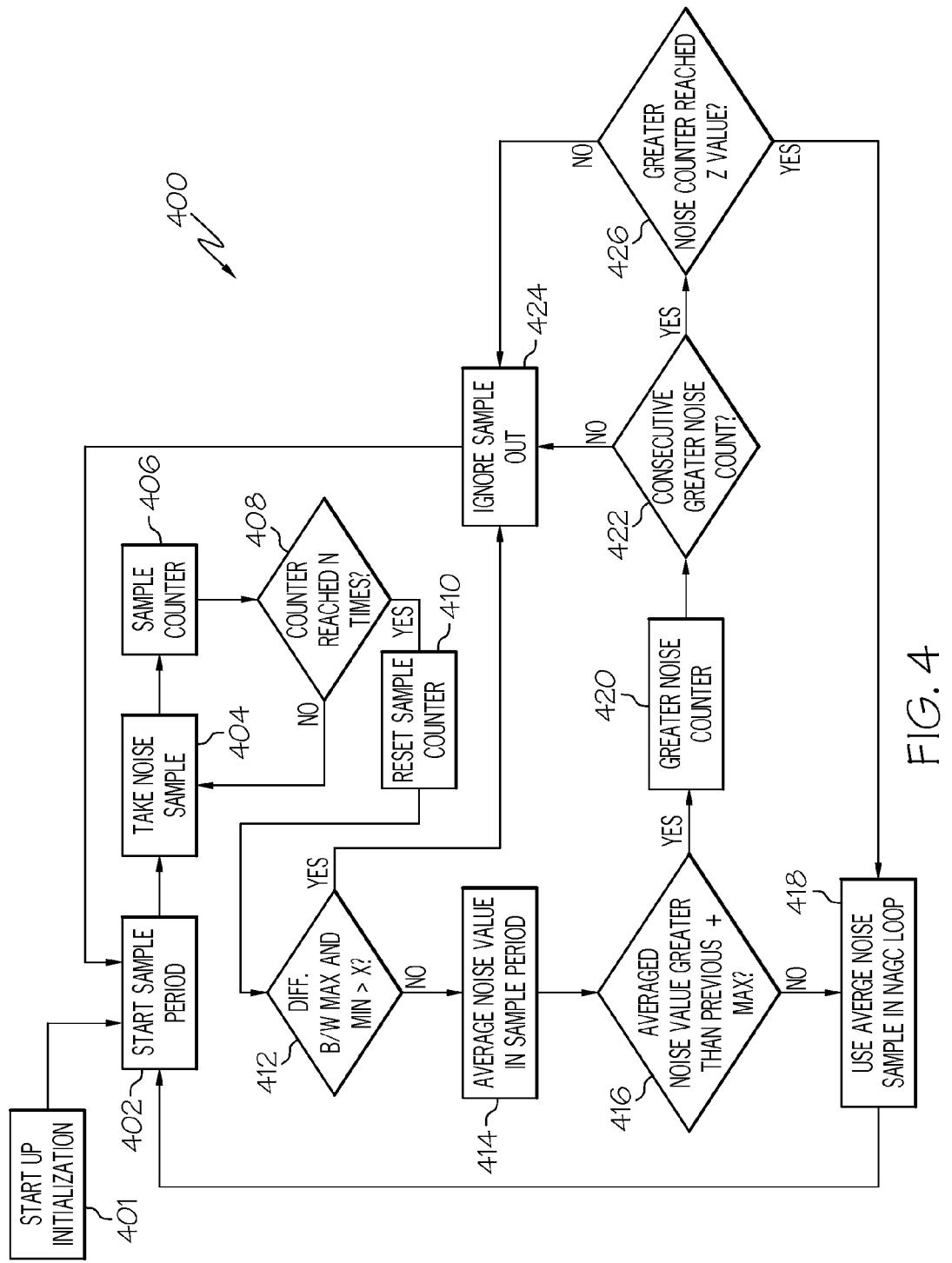
FIG. 4 is a noise spike eliminator flow diagram is illustrated.
Figure 5:
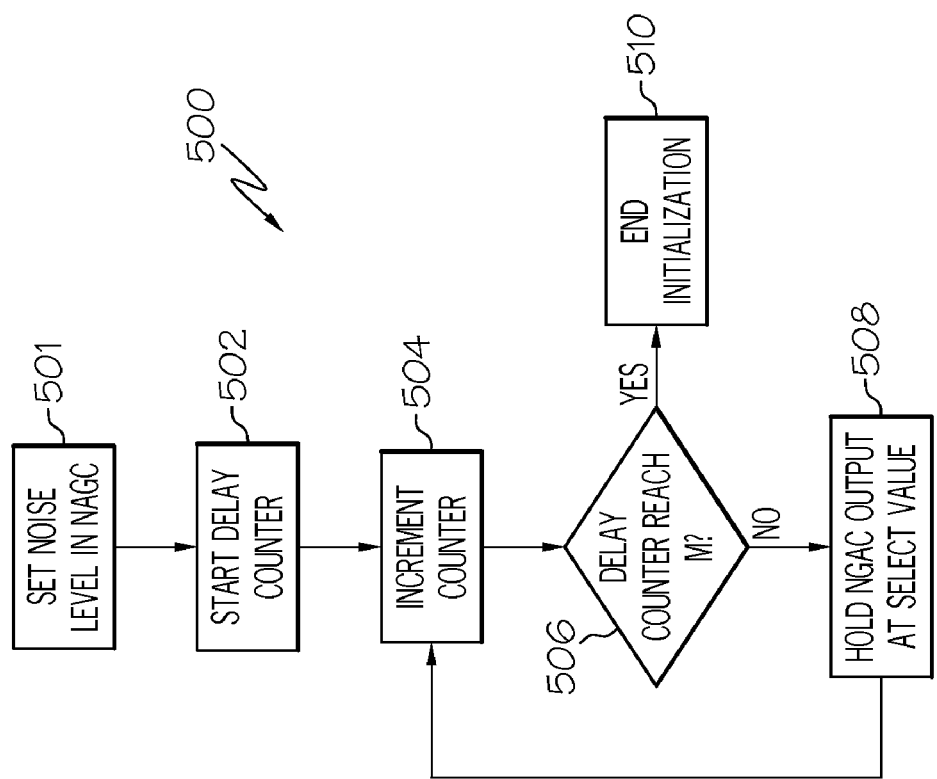
FIG. 5 illustrates an initialization flow diagram of one embodiment of the present invention.

Referring to FIG. 4, one method employed by an embodiment of the noise logic filter 204 is illustrated. As FIG. 4 illustrates the process starts at a start up initiation (401). In this step the noise level of the system is initially set on start up of the radar. In one embodiment this is done by setting noise in the NAGC to a select value based on a specific application or system design. In another embodiment, the select level is set to a maximum noise value. The noise maximum value is a maximum input level that the radar system is capable of detecting. An example of another method of start up initiation is illustrated in FIG. 5 described below. Once the startup initiation has been completed the process starts a sample period (402). During the sample period, noise sample are taken (404). A sample counter tracks the number N of samples taken in a sample period (406). The counter is monitored and it is determined when the counter has reached a select number that represents the numbers of samples taken in a sample period (408). The number of samples (N) in a sample period is set based on operating parameters of the radar system. An example of a sample period is 20 milliseconds and an example of a number of samples is 8. If the number of samples has not reached N another noise sample is taken at (404). Once the number of samples has reached N, the sample period is over and the counter is reset (410). In addition, in this embodiment, once the number of samples has reach N, it is then determined if the difference between a maximum value sample and a minimum value sample in the sample period is greater than a select value X (412). The select value X is indicative of a noise spike. If the difference is greater than X, the sample is ignored by the radar system (424) and the start of a sample period begins again at (402). If the difference is not greater than X, the average noise value during the sample period is determined (414).

Once the average noise value has been determined, it is determined if the average noise value is greater than a previous noise value plus a maximum determined increase (416). If it is not, a signal based on the average noise sample is passed on to the noise control loop (418). If the average noise value is greater than a previous value plus the maximum increase, a greater noise counter is initiated (420). It is then determined if consecutive samples with averaged noise values higher than a previous value plus the maximum increase are observed based on the counter (422). If consecutive samples with higher values are not observed, the average sample is ignored (424) and the start of a sample period begins again at (402). Ignoring samples with higher average values means not letting signals representative of the higher values adjust the gain through the control loop. Different methods for accomplishing that are contemplated as discussed above. If a consecutive samples with higher values are observed, it is determined if the greater noise counter has reached a select value (426). The select value Z is a value that is determined based on the operating perimeters of the radar system. It takes into account that after a series of consecutive samples with higher average values something more than noise spikes may be occurring and the system better take it into consideration. If the greater noise counter has not reached the Z value, the average sample value is ignored as discussed above. If the greater noise counter has reached the Z value, the average noise sample, even though it is higher than a previous sample, is used in the control loop (418). The process starts over at (402).

As stated above, FIG. 5 illustrates an initialization flow diagram 500 of another embodiment of the present invention that sets the initial noise value of the radar system. This method starts by setting a noise level in the NAGC to a select initialization value (522). In one embodiment, the select initialization value is based on application or system requirements. In another embodiment, the select initialization value is set to a maximum noise value. The maximum noise value is a maximum input level that the radar system is capable of detecting. A delay counter is started once the radar is turned on (502). The counter is incremented (504). It is then determined if the counter has reached a select number (M) (506). If the counter has not reached the select number (506), output of the NAGC is controlled by initialization value (508). That is, in this embodiment, the control loop uses the initialization value to initially control the gain. Once the delay counter has reached M (506), an end of the initiation process occurs (510). Thereafter the gain controller is in control of the control loop. The above initialization embodiment is only an example and other methods of initializing the system to a noise level are contemplated.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of dealing with noise spikes in a radar system, the method comprising:
monitoring a noise channel in the radar system;
controlling gain with a control loop based at least in part on the monitored noise channel; and
ignoring noise spikes detected in the noise channel by holding the gain at a constant level in response to the noise spikes.

2. The method of claim 1, further comprising:
taking a select number of noise level samples in the noise channel over a select sample time period.

3. The method of claim 2, further comprising:
comparing a difference between a first noise level sample having a maximum noise level in the sample time period and a second noise level sample having a minimum noise level in the sample time period to determine a maximum difference between noise samples within the sample time period;
comparing the maximum difference with a select value, wherein the select value is indicative of a noise spike; and
determining the presence of a noise spike based on the comparison.

4. The method of claim 2, further comprising:
averaging the noise level of the noise level samples in the select sample time period; and
determining if the averaged noise level of the sample is higher than a select value.

5. The method of claim 4, wherein the select value is a value of a previous averaged noise level plus a maximum determined increase.

6. The method of claim 4, further comprising:
tracking the number of consecutive samples with average noise level higher than the previous averaged noise sample plus the maximum determined increase; and
after a select number of consecutive samples with average noise levels being higher than the previous averaged noise sample plus the maximum determined increase, using one of the higher average noise levels in controlling the gain of the radar system.

7. The method of claim 4, wherein ignoring noise spikes further comprises not using an average noise value in the control loop that is higher that the previous averaged noise level plus the maximum determined increase.

8. The method of claim 7, further comprising:
maintaining the previous average noise level value to control the control loop.

9. The method of claim 1, further comprising:
initializing the radar system upon its activation.

10. The method of claim 9, wherein initializing the radar system further comprises:
setting a noise level in a noise automatic gain control (NAGC) circuit to a select initial noise level value.

11. The method of claim 10, wherein the select initial noise level value is one of a noise level based on a system requirement, an application requirement and a maximum value allowed by the system.

12. The method of claim 10, further comprising:
starting a delay counter;
incrementing the delay counter:
when the delay counter has not reached a select increment value, outputting a gain control signal from the NAGC based on the select initial noise level value;
when the delay counter has reached the select increment value, ending the initialization.

13. A method of controlling the gain in a radar system, the method comprising:
initializing a noise level in the radar system;
monitoring a noise channel in the radar system;
taking a select number of noise level samples in the noise channel for a select sample time period;
averaging the noise level of the noise level samples in the select sample time period; determining if the averaged noise level of the samples is higher than a previous averaged noise level of samples in a sample time period plus a maximum determined increase; and
if the average noise level is higher than the previous averaged noise level plus the maximum determined increase, ignoring the higher average noise sample.

14. The method of claim 13, further comprising:
if the average noise sample is lower than the previous average noise samples plus the maximum determined increase, using the lower average noise sample to control at least in part the gain of the radar system.

15. The method of claim 13, further comprising:
comparing a difference between a first noise level sample having a maximum noise level in the sample time period and a second noise level sample having a minimum noise level in the sample time period to determine a maximum difference between noise samples within the sample time period;

comparing the maximum difference with a select value, wherein the select value is indicative of a noise spike; and
determining the presence of a noise spike based on the comparison.

16. A radar system, the radar system comprising:
a receiver configured to receive radar signals;
a transmitter configured to transmit radar signals;
a noise channel in communication with the receiver, the noise channel configured to monitor the noise in the radar system;
a control loop configured to adjust the gain of the radar system; and
a gain controller in communication with the noise channel and the control loop, the gain controller configured to control signals to the control loop, the gain controller further configured to ignore noise spikes in the noise channel by holding the gain at a constant level in response to the noise spikes.

17. The radar system of claim 16, wherein the gain controller further comprises:
noise filter logic configured to average noise level samples in a select period of time and determine if the averaged noise level of the samples is higher than an averaged noise level of previous samples.

18. The radar system of claim 17, wherein the noise filter logic further comprises:
a processor to compute average noise levels; and
a memory to store past average noise levels in communication with the processor.

19. The radar system of claim 16, wherein the control loop is coupled to control the gain in a gain circuit in a digital processing system portion of the radar system.

20. The radar system of claim 16, wherein the control loop is coupled to control gain in the receiver.

* * * * *